(12) United States Patent
Jody et al.

(10) Patent No.: US 6,599,950 B2
(45) Date of Patent: Jul. 29, 2003

(54) PROCESS FOR THE RECOVERY AND SEPARATION OF PLASTICS

(75) Inventors: Bassam J. Jody, Tinley Park, IL (US); Edward J. Daniels, Oak Lawn, IL (US); Joseph A. Pomykala, Jr., Plainfield, IL (US)

(73) Assignee: The University of Chicago, Chicago, IL (US)

( * ) Notice: Subject to any disclaimer, the term of this patent is extended or adjusted under 35 U.S.C. 154(b) by 90 days.

(21) Appl. No.: 09/821,181

(22) Filed: Mar. 29, 2001

(65) Prior Publication Data

US 2003/0027877 A1 Feb. 6, 2003

(51) Int. Cl.$^7$ ................................................ C08J 11/04
(52) U.S. Cl. .......................................... 521/48; 521/40
(58) Field of Search ...................... 521/40, 40.5, 48, 521/48.5

(56) References Cited

U.S. PATENT DOCUMENTS 5,377,844 A  *  1/1995  Hwang ....................... 209/197
5,399,433 A     3/1995  Kobler
5,653,867 A  *  8/1997  Jody et al. ................... 209/164
5,738,222 A  *  4/1998  Pagenkopf et al. ............ 209/7

* cited by examiner

Primary Examiner—Edward J. Cain
Assistant Examiner—Katarzyna Wyrozebski Lee
(74) Attorney, Agent, or Firm—Emrich and Dithmar

(57) ABSTRACT

A method of separating a portion of acrylonitrile-butadiene-styrene (ABS) from a mixture containing ABS and for separating a portion of ABS and polycarbonate (PC) from a mixture of plastics containing ABS and PC is disclosed. The method includes shredding and/or granulating the mixture of plastics containing ABS and PC to provide a selected particle size; sequentially dispersing the shredded mixture of plastics in a series aqueous solutions having different specific gravities and separating the floating fraction until the desired separation is obtained. Surface tension and pH are also variable to be controlled.

24 Claims, 3 Drawing Sheets

PROCESS FOR THE RECOVERY AND SEPARATION OF PLASTICS

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

The present invention relates to a process for the recovery and separation of plastics.

BACKGROUND OF THE INVENTION

More specifically, the present invention relates to a process for the recovery and separation of plastics which relate inter alia, to the electronics industry. It also relates to plastics recovered from industries other than the electronic industries. Out of date computers, specifically monitor houses, CPU cases and keyboards present an un-ending source of potentially recyclable plastics.

At present, the high value precious metals, electronic components and glass electronic components are separated from the plastic housings which are then generally sent to landfill because there is no economical process to separate the plastics to sufficient purity to enable the plastics to be recycled. The housings are generally made of mixed plastics such as acrylonitrile-butadiene-styrene (ABS) and polycarbonate (PC).

Accordingly, the present invention provides an improved method for the separation of acrylonitrile-butadiene-styrene (ABS) and polycarbonate (PC), ABS/PC alloy, and other plastics such as polystyrene (PS), high-impact polystyrene (HIPS), polypropylene (PP), polyethylene and poly oxyphenylene. However, the dominant species of plastics used for electronics are ABS and PC and alloys of the two. In addition, much of the ABS material is made of different grades having different specific gravities. The problem then is to develop a process for the separation of plastics used in electronics that provides a very high degree of purity (over 96%) and is relatively inexpensive to utilize.

The process for the separation and recovery of valuable electronic related plastics such as ABS, PC and ABS/PC alloy consists of shredding the plastic mixture into about ¼" pieces, and thereafter passing the shredded material into a series of tanks containing aqueous solutions of differing characteristics such as pH, surface tension and specific gravity, whereby the plastic components are separated into various product and waste streams. The inventors have found that they are able to recover valuable plastics such as ABS-PC product of greater than 96% purity with an expected recovery rate of about 50% by weight of the ABS and PC present in the feed stream. Additional stages can be added to the process to recover additional ABS-PC product with a purity of greater than 98% and yield or recovery rate of about 70% by weight.

Moreover, the invention also relates to the separation and recovery of polyethylene and polypropylene. Polyethylene and polypropylene are two non-compatible plastics that have very similar properties, which makes their separation from each other very difficult and expensive. Therefore, to the best of our knowledge, no process to separate them from each other is practiced on commercial scale today. Small amounts of one of them in the other renders the mixture virtually useless because of its poor properties, that result from their non-compatibility. In addition, several grades of these two polymers are used commercially, specially in durable products such as automobiles. The value of the mixture is essentially its heat value which is about 5 cents per lb. On the other hand, if the mixture can be separated, the value of the individual species is between 10 and 20 cents per lb.

Working with polyethylene and polypropylene mixtures recovered from automobile shredder residue, we discovered that in a solution having a specific gravity of 0.91–0.93, a surface tension of 34±2 dynes/cm, and a pH of 8.5±0.5, quarter inch chips of the two polymers will separate from each other in purities greater than 95% and exceeding 99%. The polypropylene floats while the polyethylene sinks. These results were achieved without bubbling air through the solution, and without precleaning of the plastics. Bubbling air through the solution after removing the floating polypropylene resulted in further purification of the polyethylene. The specific gravity can be adjusted by adding a water soluble light organic solvent, such as acetone or an alcohol or other liquifier than water organic solvent. Surfactants can also be used to adjust the surface tension and the pH an be adjusted with a base such as NaOH.

Recycling different types of plastics has increased in recent years. Processes for separating different plastic types have become increasingly important. For example, "Recovering Plastics for Recycling by Mineral Processing Techniques" by R. Buchan and B. Yarar, JOM, February, 1995, pps. 52–55, discloses a process for separating plastics by use of a mineral processing technology.

U.S. Pat. No. 5,399,433, issued Mar. 21, 1995 to Kohler, discloses a method for separating a polyethylene terephthalate (PET)/polyvinyl chloride (PVC) chip admixture. The PET/PVC chip admixture is contacted with a surface conditioning agent to produce relatively hydrophobic polyvinyl chloride chips which can be floated in an aerated aqueous medium. The polyethylene terephthalate chips are recovered from the bottom of the aqueous medium. The flotation is conducted in pure water without frothing or densifying agents.

Separation of solids using differences in their densities is a simple, economical and effective technique. A liquid whose density is between the densities of two solids can be used as the working medium. The solid with the lesser density floats and the solid with the higher density sinks resulting in the separation of the solid mixture. However, materials that have similar densities, such as acrylonitrile butadiene styrene, ABS, and high impact polystyrene, HIPS, can not be separated in high purities by this simple and inexpensive technique.

Our previous U.S. Pat. No. 5,653,867 which issued Aug. 5, 1997 related to the separation of high impact polystyrene (HIPS) and acrylonitrile-butadiene-styrene (ABS) plastics, the disclosure of which is herein incorporated by reference. While the process described in the '867 patent is similar to the process of the present invention, the conditions required to separate ABS from polycarbonate (PC) are very different from that disclosed in the '867 patent and if high purity is to be obtained is much more complicated.

OBJECTS OF THE INVENTION

Accordingly, it is an object of the present invention to provide an improved method for the separation of acrylonitrile-butadiene-styrene (ABS) and polycarbonate (PC) from electronic waste streams.

It is another object of the present invention to provide an improved method and process for the separation of polypropylene (PP) and polyethylene (PE) from each other.

Another object of the invention is to provide a method of separating ABS and PC or PP from PE without the use of organic solvents, at ambient condition to minimize energy consumption and to reduce waste material.

Another object of the present invention is to provide an improved method for the separation of ABS and PC from other plastics as well as the separation of PP from PE which is reliable and effective.

In accordance with these and other objects of the invention, improved methods of separating ABS and PC from plastics and waste streams as well as separating polypropylene and/or polyethylene from combinations of polypropylene and polypropylene are provided. The plastics, whether or not electronic plastics, contain substantial quantities of ABS and PC or other plastics which contain substantial quantities of polypropylene and polyethylene are shredded and thereafter dispersed in the solution having a predetermined density, surface tension and pH; preferably the process is carried out at ambient temperatures and pressures.

In accordance with a feature of the invention, a novel method is provided, in the first case, for separating ABS and PC by selectively modifying the effective density or specific gravity of one or more of these plastics in a solution in which the shredded plastic materials are dispersed so as to cause a certain fraction to float and another fraction to sink. Thereafter, this procedure may be repeated a number of times, in each varying either or all of the parameters of specific gravity, surface tension and pH in order to successively float a portion of the material causing the remaining material to sink. The floated material can be separated from the material which sinks and so on until eventually all desired material or substantially all the desired material has been removed and segregated. In general, basic pHs are maintained and more specifically, it is preferred, although not required to use potassium carbonate as both a means by which pH is regulated and also a means by which the specific gravity or density of the solution is regulated. Other salts and/or bases may be used in addition to or in lieu of potassium carbonate, for instance sodium chloride, potassium chloride, sodium hydroxide or potassium hydroxide are useful, but in general, potassium carbonate is preferred for its ease of use and plentiful supply. A surfactant may be added to control the surface tension within the specified ranges hereinafter set forth.

SUMMARY OF THE INVENTION

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
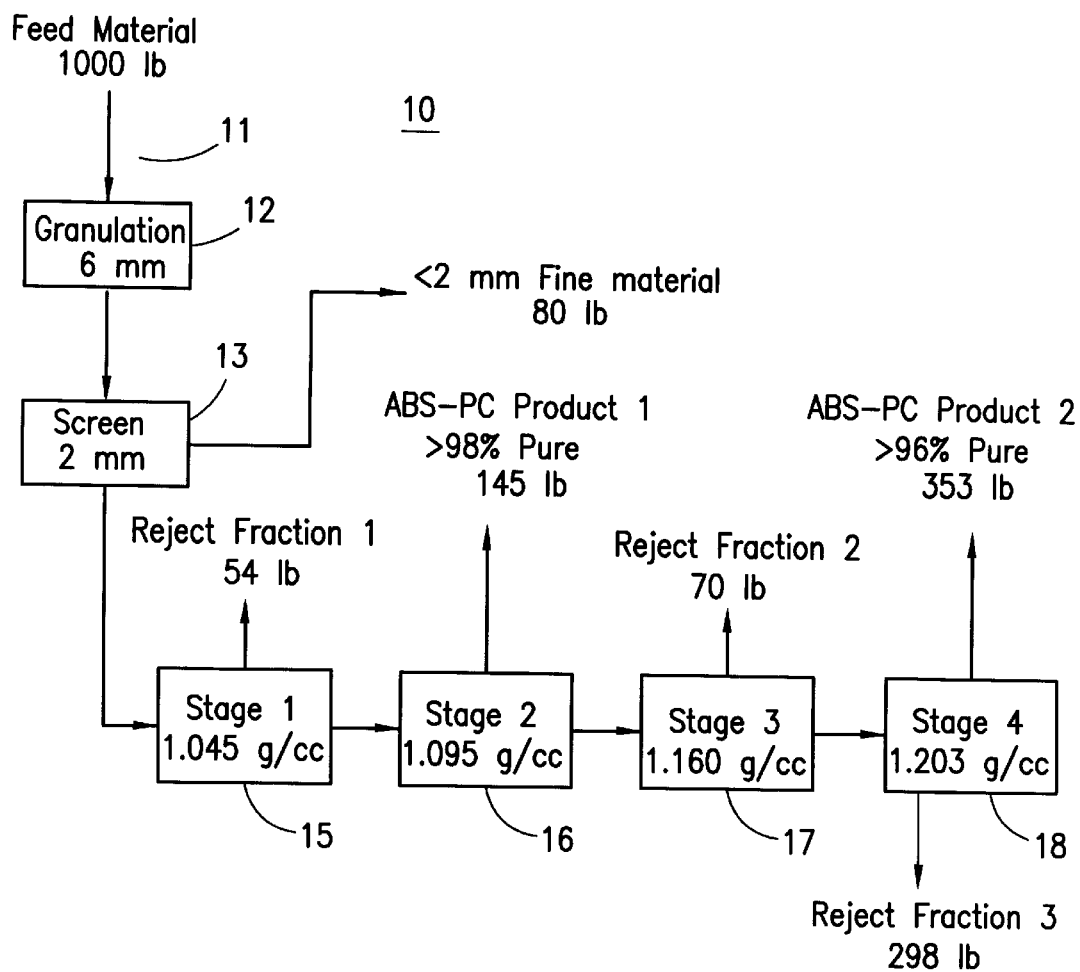
FIG. 1 is a schematic drawing of a four stage system for separating ABS and PC from mixed feed materials containing both.

Referring to FIG. 1 there is shown in schematic and block diagram representative of a material processing stream used for the effective separation of acrylonitrile-butadiene-styrene (ABS) and polycarbonate (PC) plastics from a waste stream in accordance with the invention generally designated by the numeral 10. A waste stream 11 is passed through a shredding station 12 and thereafter through a screening station 13. The screening station separates less than 2 mm fine materials from the shredded waste stream 11, the shredding granulating stage 12 reduces the material to a selected size, for example 0.25 inch or about 6.5 mm in longest dimension. The material separated by the screening station is then transmitted to a first floatation stage 15. More specifically, the granulated feed material must first be processed through a screening system. This avoids contamination of the product streams with fines that may contain impurities.

This removes fines that are smaller than, for instance, 2 mm in size. Based on a 1000 pound sample of feed material, 80 pounds of the fines were removed by the screening process. The balance of the material was then processed through the four stages containing aqueous potassium carbonate/surfactant solutions. The solution for each stage had a pH of 11.5±0.8, and a surface tension of 34±4 dynes/cm. The density of the solution for each individual stage was different depending on the specific gravities of the plastics in the mixture. A break down of the composition of the recovered fraction from each stage is in Table 1.

TABLE 1

Composition of the Recovered Fractions from Process A
Weight Percent Composition of Each Fraction

|  | Weight Percent of Feed Material | ABS | PC | PS | POLY (OXY Phenylene) | Heavily-Filled Polymer | Other | Total |
| --- | --- | --- | --- | --- | --- | --- | --- | --- |
| Reject 1 (Floaters at specific gravity = 1.045) | 5.84 | 9.43 | 0.98 | 83.50 | 0.30 | 0.00 | 5.80 | 100 |
| Product 1 (Floaters at specific gravity = 1.095) | 15.80 | 96.83 | 2.38 | 0.00 | 0.00 | 0.00 | 0.79 | 100 |

TABLE 1-continued

Composition of the Recovered Fractions from Process A
Weight Percent Composition of Each Fraction

|  | Weight Percent of Feed Material | ABS | PC | PS | POLY (OXY Phenylene) | Heavily-Filled Polymer | Other | Total |
|---|---|---|---|---|---|---|---|---|
| Reject 2 (Floaters at specific gravity = 1.160) | 7.65 | 27.95 | 4.11 | 0.00 | 67.94 | 0.00 | 0.00 | 100 |
| Product 2 (Floaters at specific gravity = 1.203) | 38.33 | 30.04 | 66.47 | 0.00 | 0.82 | 2.67 | 0.00 | 100 |
| Reject 3 (Sinkers at specific gravity = 1.203) | 32.38 | 12.71 | 45.01 | 0.77 | 0.87 | 25.72 | 14.92 | 100 |

Stage 1 requires a specific gravity of 1.04±0.01 and more preferably 1.045. The floaters, reject fraction 1, account for 54 pounds of the feed material. This fraction contains 45 pounds of polystyrene. An additional three pounds of impurities is removed from the feed stream during this stage but a loss of six pounds of product (i.e., ABS, PC) also occurred. The sinkers of this stage are input to stage 2.

Stage 2 requires a specific gravity of 1.09±0.01 and more preferably 1.095. The floaters, product fraction 1, account for 145 pounds of the feed material. This fraction is greater than 98% pure and contains 142 pounds ABS and two pounds polycarbonate (PC). This fraction also contains one pound of material that was not identified through FTIR analysis. This material is referred to and labeled as "other". The sinkers of this stage are input to stage 3.

Stage 3 requires a specific gravity of 1.160±0.01. The floaters, rejection fraction 2, account for 70 pounds of the feed material. This fraction is 68-weight percent of a material which has an IR spectra similar to poly (oxyphenylene), which is 48 pounds of the feed material. Additional impurities were removed during this stage but a loss of 22 pounds of product (ABS, PC) will also occur. The sinkers of this stage are input to stage 4.

Stage 4 requires a specific gravity of 1.203±0.002. The floaters, product fraction 2, account for 353 pounds of the feed material. This fraction is greater than 96% pure and contains 106 pounds of ABS and 235 pounds of polycarbonate. This fraction also contains three pounds of poly (oxyphenylene) and nine pounds of the heavily-filled polymer. As discussed previously, this fraction needs to be tested to investigate if the heavily-filled material is compatible with the product material. If this material is found to be incompatible with the product, removal of this material is possible by optimizing the froth-flotation solution. The sinkers, reject fraction 3, account for 298 pounds of the feed material. This fraction, which contains 58-weight percent product (172 pounds of ABS and PC), is presently considered a product loss. This fraction also contains 77 pounds of the heavily-filled polymer and 49 pounds of other impurities. Depending on the compatibility of the heavily-filled polymer with the product, and the optimization of the froth-flotation process, the overall product recovery may be increased by recovering the product from this fraction. The weights (basis of 1000 pounds) of the separated fractions from the four-stage process are detailed in Table 2.

TABLE 2

Weights of the Separated Fractions of Process A

|  | Weight (lbs.) | ABS (lbs.) | PC (lbs.) | PS (lbs) | Poly (OXY-phenylene (lbs) | Heavily-Filled Polymer (lbs.) | Other (lbs) |
|---|---|---|---|---|---|---|---|
| Screened Reject Stream (<2 mm Fine Material) | 80 | N/A* | N/A* | N/A* | N/A* | N/A* | 80 (includes ABS, PC, PS and Poly oxy) |
| Reject 1 (Floaters at specific gravity = 1.045) | 54 | 5 | 1 | 45 | 0 | 0 | 3 |
| Product 1 (Floaters at specific gravity = 1.095) | 145 | 142 | 2 | 0 | 0 | 0 | 1 |
| Reject 2 (Floaters at specific gravity = 1.160) | 70 | 19 | 3 | 0 | 48 | 0 | 0 |
| Product 2 (Floaters at specific gravity = 1.203) | 353 | 106 | 235 | 0 | 3 | 9 | 0 |
| Reject 3 (Sinkers at specific gravity = 1.203) | 298 | 38 | 134 | 2 | 3 | 77 | 44 |
| TOTAL: | 1000 | 310 | 375 | 47 | 54 | 86 | 128 |

*The <2 mm fine-material particle size was not analyzed by FTIR.

Figure 2:
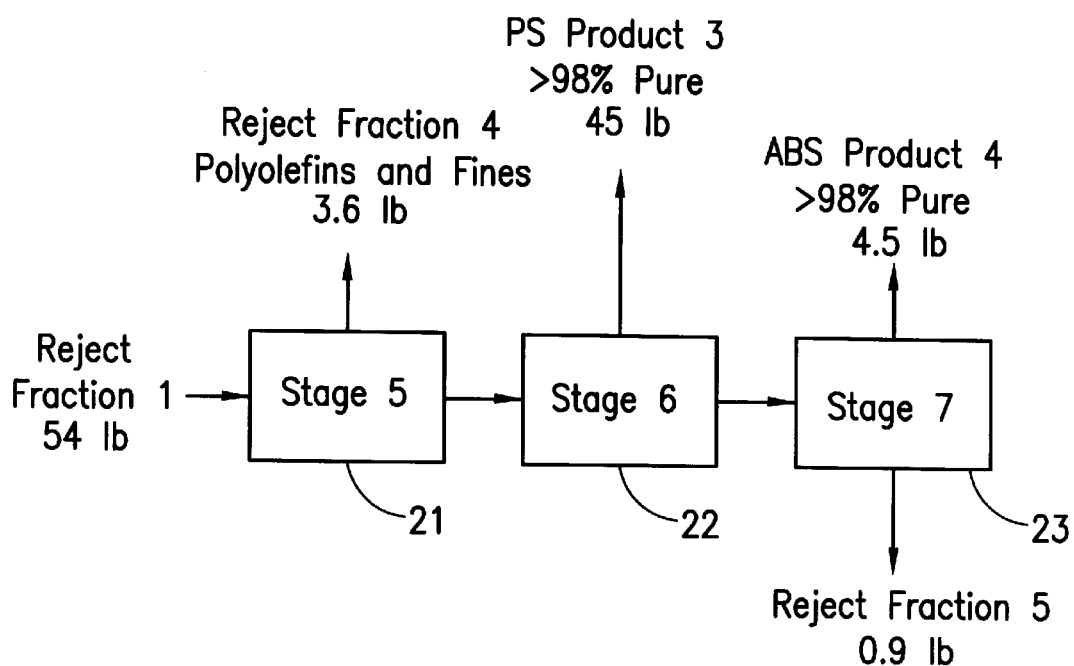
FIG. 2 is a schematic representation of a system for recovering materials from the residual of the first stage illustrated in FIG. 1.

The light fraction (reject 1) coming from flotation stage 15 may be treated as illustrated in FIG. 2. This stream contains about 6.7% polyolefin fines and (coming off of flotation tank 21), another 83.3 percent polystyrene coming off of flotation tank 22 (greater than 98% pure) and finally 8.3% ABS, (greater than 98% pure), coming from flotation tank 23, the remaining 1.2% being rejected (rejects).

Figure 3:
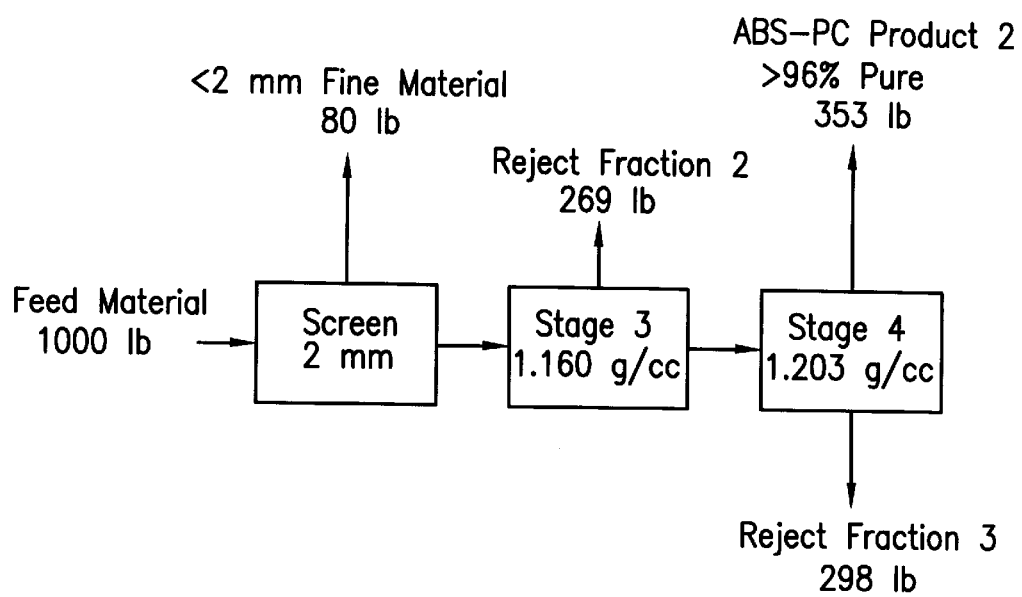
FIG. 3 is a schematic illustration of a two step method of separating ABS and PC from a mixed feed material containing ABS and PC.

Referring now to FIG. 3 a two-stage separation system is disclosed that can be used to recover products from feed material with a composition similar to the 1000-pound sample. Process B would consist of the final two stages of process A. These two stages alone would produce an ABS-PC product with purity greater than 96%. The recovery of the product for this process would only be 50% by weight of the ABS and PC present in the feed stream.

In summary, through the use of a two-stage system, we are able to produce a product of ABS-PC from the 1000-pound feed material that was greater than 96% pure with a recovery of 50% of the ABS and PC present in the feed stream. There are two types of polymer contaminates in the product. One of the polymers, having similar IR spectrum to that of poly(oxyphenylene), accounts for 1% of the product fraction. The remaining 3% of the product fraction is a heavily-filled polymer. This polymer cannot easily be identified through FTIR analysis due to the large amount of fillers present.

By increasing the process to a four-stage system, an additional product fraction is obtained. This fraction has a purity greater than 98%. Recovery of this fraction increases the overall recovery of ABS and PC by 145 pounds for each 1000 pounds of feed material.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of separating a portion of acrylonitrile-butadiene-styrene (ABS) from a mixture containing ABS and for separating a portion of ABS and polycarbonate (PC) from a mixture of plastics containing ABS and PC comprising the steps of:
   shredding and/or granulating the mixture of plastics containing ABS and PC to provide a selected particle size;
   dispersing the shredded mixture of plastics in a first aqueous solution having a specific gravity of 1.04±0.01 g/cc, a pH in the range of 11.5±0.8 and a surface tension of 34±4 dynes/cm wherein a first reject fraction floats and a first retained fraction sinks, separating the first reject fraction from the first aqueous solution, introducing the first retained fraction into a second aqueous solution having a specific gravity of 1.09±0.01 g/cc and a pH in the range of 11.5±0.8 and a surface tension of 34±4 dynes/cm wherein a first product fraction floats and a second retained fraction sinks, separating the first product fraction from the second aqueous solution with the second retained fraction, introducing the second retained fraction into a third aqueous solution having a specific gravity of 1.16±0.01 and a pH in the range of 11.5±0.8 and a surface tension of 34±4 dynes/cm wherein a second reject fraction floats and a third retained fraction sinks, separating the second reject fraction from the third aqueous solution with the third retained fraction, introducing the third retained fraction into a fourth aqueous solution having a specific gravity of 1.203±0.002 and a pH in the range of 11.5±0.8 and a surface tension of 34±4 dynes/cm wherein a second product fraction floats and a third reject fraction sinks, and separating the second product fraction from the third reject fraction, wherein the first and second product fractions after drying are not less than about 96% ABS and PC.

2. The method of claim 1, wherein the plastics are shredded to pieces of about ¼ inches in longest dimension before being dispersed in the first aqueous solution.

3. The method of claim 1, wherein the specific gravity and pH are adjusted with a water soluble salt.

4. The method of claim 3, wherein a salt is potassium carbonate.

5. The method of claim 3, wherein the combined product fractions when dried are in excess of 96% by weight ABS and PC.

6. The method of claim 5, wherein the ABS product fraction when dried has a purity in excess of 98%.

7. The method of claim 1, and further comprising screening the mixture containing ABS and PC after shredding to remove material passing through a 2 mm screen.

8. The method of claim 1, wherein the aqueous solutions are maintained at ambient temperatures and ambient pressure.

9. The method of claim 1, wherein the first and second product fractions are not less than 49% by weight of the mixture of plastics containing ABS and PC.

10. The method of claim 1, wherein the first product fraction when dried contains over 98% by weight ABS and PC.

11. The method of claim 1, wherein the first product fraction when dried is not less than 14% by weight of the mixture of plastics containing ABS and PC.

12. The method of claim 1, wherein the second product fraction when dried is not less than 35% by weight of the mixture of plastics containing ABS and PC.

13. The method of claim 1, wherein the first aqueous solution has a specific gravity of about 1.045 g/cc and a pH of about 11.5 and a surface tension of about 34.

14. The method of claim 1, wherein the second aqueous solution has a specific gravity of about 1.095 g/cc and a pH of about 11.5 and a surface tension of 34±4 dynes/cm.

15. The method of claim 1, wherein the third aqueous solution has a specific gravity of about 1.160 g/cc and a pH of abut 11.5 and a surface tension of 34±4 dynes/cm.

16. The method of claim 1, wherein the fourth aqueous solution has a specific gravity of about 1.203 and a pH of about 11.5 and a surface tension of 34±4 dynes/cm.

17. The method of claim 1, wherein the first reject fraction is treated to separate polyolefins and further treated to separate polystyrene about 98% purity and further treating the first reject fraction to recover ABS having a purity in excess of 98%.

18. A method of separating acrylonitrile-butadiene-styrene (ABS) and polycarbonate (PC) from a mixture of plastics containing ABS and PC comprising the steps of:
   shredding and/or granulating the mixture of plastics containing ABS and PC to provide a selected particle size;
   dispersing the shredded mixture of plastics in a first aqueous solution having a specific gravity of about 1.16 to 0.01 g/cc, a pH in the range of 11.5±0.8 and a surface tension of 34±4 dynes/cm wherein a first reject fraction floats and a first retained fraction sinks, separating the first reject fraction from the first aqueous solution with the first retained fraction, introducing the first retained fraction into a second aqueous solution having a specific gravity of about 1.203±0.002 g/cc and a pH in the range of 11.5±0.8 and a surface tension of 34±4 dynes/cm wherein a first product fraction floats and a second retained fraction sinks, separating the first product fraction from the second aqueous solution with the second retained fraction, whereby not less than about 96% by weight of the first product fraction is ABS or PC.

19. A method of separating polypropylene and polyethylene from each other from a mixture of plastics containing polypropylene and polyethylene comprising the steps of:
shredding and/or granulating the mixture containing polypropylene and polyethylene to provide a selected particle size;
dispersing the shredded mixture in an aqueous solution having a specific gravity 0.91 to 0.93 g/cc adjusted with a light water soluble organic solvent, a surface tension of 34±2 dynes/cm and a pH of 8.5±0.5 herein the polypropylene floats and the polyethylene sinks, and separating the polypropylene from the polyethylene.

20. The method of claim 19, wherein the specific gravity is adjusted with a light organic water soluble solvent.

21. The method of claim 20, wherein the solvent is acetone.

22. The method of claim 21, wherein the mixture of plastic is shredded or granulated to particles of about ¼ inch.

23. A method of separating a portion of acrylonitrile-butadiene-styrene (ABS) from a mixture containing ABS and for separating a portion of ABS and polycarbonate (PC) from a mixture of plastics containing ABS and PC comprising the steps of: shredding and/or granulating the mixture of plastics containing ABS and PC to provide a selected particle size;
dispersing the shredded mixture of plastics in a first aqueous solution having a specific gravity of 1.04±0.01 g/cc, a pH in the range of 11.5±0.8 and a surface tension of 34±4 dynes/cm wherein a first reject fraction floats and a first retained fraction sinks, separating the first reject fraction from the first aqueous solution, introducing the first retained fraction into a second aqueous solution having a specific gravity of 1.09±0.01 g/cc and a pH in the range of 11.5±0.8 and a surface tension of 34±4 dynes/cm wherein a first product fraction floats and a second retained fraction sinks, separating the first product fraction from the second aqueous solution with the second retained fraction, introducing the second retained fraction into a third aqueous solution having a specific gravity of 1.16±0.01 and a pH in the range of 11.5±0.8 and a surface tension of 34±4 dynes/cm wherein a second reject fraction floats and a third retained fraction sinks, separating the second reject fraction from the third aqueous solution with the third retained fraction, introducing the third retained fraction into a fourth aqueous solution having a specific gravity of 1.203±0.002 and a pH in the range of 11.5±0.8 and a surface tension of 34±4 dynes/cm wherein a second product fraction floats and a third reject fraction sinks, and separating the second product fraction from the third reject fraction, wherein the first product fraction after drying is not less than about 98% ABS and PC.

24. A method of separating polypropylene and polyethylene from each other from a mixture of plastics containing polypropylene and polyethylene comprising the steps of:
shredding and/or granulating the mixture containing polypropylene and polyethylene to provide a selected particle size;
dispersing the shredded mixture in an aqueous solution having a specific gravity 0.91 to 0.93 g/cc adjusted with a light water soluble organic solvent, a surface tension of 34±2 dynes/cm and a pH of 8.5±0.5 wherein the polypropylene floats and the polyethylene sinks, and separating the polypropylene from the polyethylene.

* * * * *

UNITED STATES PATENT AND TRADEMARK OFFICE
CERTIFICATE OF CORRECTION

PATENT NO.     : 6,599,950 B2
DATED          : July 29, 2003
INVENTOR(S)    : Jody et al.

It is certified that error appears in the above-identified patent and that said Letters Patent is hereby corrected as shown below:

Column 9,
Line 14, "herein" should be -- wherein --.

Signed and Sealed this

Sixteenth Day of December, 2003

JAMES E. ROGAN
*Director of the United States Patent and Trademark Office*